(12) United States Patent
Takigawa et al.

(10) Patent No.: US 11,303,951 B2
(45) Date of Patent: Apr. 12, 2022

(54) CONTENT REPRODUCTION PROGRAM AND CONTENT REPRODUCTION DEVICE

(71) Applicant: Evixar Inc., Tokyo (JP)

(72) Inventors: Atsushi Takigawa, Tokyo (JP); Hisaharu Suzuki, Tokyo (JP); Takeshi Nasu, Tokyo (JP); Yasuhiko Nagatomo, Tokyo (JP)

(73) Assignee: Evixar Inc., Tokyo (JP)

( * ) Notice: Subject to any disclaimer, the term of this patent is extended or adjusted under 35 U.S.C. 154(b) by 0 days.

(21) Appl. No.: 16/345,568

(22) PCT Filed: Oct. 27, 2016

(86) PCT No.: PCT/JP2016/081900
§ 371 (c)(1),
(2) Date: Apr. 26, 2019

(87) PCT Pub. No.: WO2018/078768
PCT Pub. Date: May 3, 2018

(65) Prior Publication Data
US 2019/0253749 A1    Aug. 15, 2019

(51) Int. Cl.
*H04N 21/43*    (2011.01)
*H04N 21/8547*    (2011.01)
(Continued)

(52) U.S. Cl.
CPC ......... *H04N 21/4307* (2013.01); *G11B 27/11* (2013.01); *H04N 21/439* (2013.01);
(Continued)

(58) Field of Classification Search
CPC ........... H04N 21/4307; H04N 21/8358; H04N 21/44; H04N 21/439; H04N 21/8133; H04N 21/8547; G11B 27/11
(Continued)

(56) References Cited

U.S. PATENT DOCUMENTS

| 8,763,029 | B1* | 6/2014 | Haberman | H04N 21/812 725/32 |
| 8,958,686 | B2* | 2/2015 | Tsurumi | H04N 5/91 386/248 |
| 10,622,024 | B2* | 4/2020 | Hirajoh | G06F 3/04847 |

(Continued)

FOREIGN PATENT DOCUMENTS

| CN | 103702145 A | 4/2014 |
| JP | 2015-61112 | 3/2015 |
| JP | 2016165123 A | 9/2016 |

*Primary Examiner* — Helen Shibru
(74) *Attorney, Agent, or Firm* — Finnegan, Henderson, Farabow, Garrett & Dunner, LLP (57) ABSTRACT

The time axis of certain content is easily and reliably determined, and other content is reproduced in synchronization with the reproduction of the content. A content reproduction program causes a computer to implement: a sound detection unit that detects sound of first content reproduced outside the computer; a time axis determination unit that determines, on the basis of the detected sound, a time axis of second content reproduced subsequent to the first content outside the computer; and a content reproduction unit that reproduces third content corresponding to the second content in synchronization with reproduction of the second content on the basis of the determined time axis.

8 Claims, 7 Drawing Sheets

(51) Int. Cl.
*G11B 27/11* (2006.01)
*H04N 21/81* (2011.01)
*H04N 21/439* (2011.01)
*H04N 21/44* (2011.01)
*H04N 21/8358* (2011.01)

(52) U.S. Cl.
CPC ......... *H04N 21/44* (2013.01); *H04N 21/8133* (2013.01); *H04N 21/8358* (2013.01); *H04N 21/8547* (2013.01)

(58) Field of Classification Search
USPC ....................................................... 386/201
See application file for complete search history.

(56) References Cited

U.S. PATENT DOCUMENTS

| | | | |
|---|---|---|---|
| 2007/0177466 A1* | 8/2007 | Ando | H04N 21/4147 369/13.01 |
| 2008/0027729 A1* | 1/2008 | Herre | H04H 20/31 704/273 |
| 2012/0064874 A1* | 3/2012 | Pierce, Jr. | H04M 1/72403 455/418 |
| 2013/0083036 A1* | 4/2013 | Cario | A63F 13/60 345/473 |
| 2014/0142958 A1* | 5/2014 | Sharma | G10L 19/02 704/500 |
| 2015/0082332 A1 | 3/2015 | Wright et al. | |
| 2016/0014467 A1 | 1/2016 | Zhang | |
| 2016/0231981 A1 | 8/2016 | Lin et al. | |
| 2019/0116395 A1* | 4/2019 | Kerdranvat | H04N 21/42203 |
| 2020/0245022 A1* | 7/2020 | Wright | H04N 21/812 |
| 2021/0144433 A1* | 5/2021 | Suzuki | H04N 21/43072 |

* cited by examiner

CONTENT REPRODUCTION PROGRAM AND CONTENT REPRODUCTION DEVICE

CROSS REFERENCE TO RELATED APPLICATIONS

This application is a national phase application based on international application number PCT/JP2016/081900, filed Oct. 27, 2016, the contents of which are incorporated herein by reference in its entirety.

TECHNICAL FIELD

The present invention relates to a content reproduction program and a content reproduction device.

BACKGROUND ART

There has been disclosed a method for outputting second screen information for video accompanied with sound to a mobile device enabling the input/output of sound and the display of an image (Patent Document 1). According to the method disclosed in Patent Document 1, a time code associated with each video scene of the video is embedded in the sound as watermark data. Then, data corresponding to second screen information is stored in advance in a mobile device so as to be associated with the time code, the sound is input to the mobile device near the video, and the second screen information is output in synchronization with the video scenes.

CITATION LIST

Patent Document

Patent Document 1: Patent Publication JP-A-2015-61112

SUMMARY

Technical Problem

According to the method disclosed in Patent Document 1, watermark data is required to be embedded in sound so as to be associated with each video scene. Therefore, a work load for manufacturing content such as a movie is high, and thus the embedding of watermark data cannot be performed for manufacturer's own convenience in some cases.

Although a method for determining the time axis of video with fingerprint that is the feature amount of sound instead of watermark data has been known, the fingerprint cannot be created in a silent situation or at a place where steady sound continues. Further, when completely the same sound is used in different time zones in one video, each of the time zones cannot be discriminated from each other with fingerprint.

In view of the above problems, the present invention has an object of providing a content reproduction program and a content reproduction device that easily and reliably determine the time axis of certain content and reproduce other content in synchronization with the reproduction of the content.

Solution to Problem

A content reproduction program according to an aspect of the present invention causes a computer to implement: a sound detection unit that detects sound of first content reproduced outside the computer; a time axis determination unit that determines, on the basis of the detected sound, a time axis of second content reproduced subsequent to the first content outside the computer; and a content reproduction unit that reproduces third content corresponding to the second content in synchronization with reproduction of the second content on the basis of the determined time axis.

A content reproduction device according to an aspect of the present invention includes: a sound detection unit that detects sound of first content reproduced outside; a time axis determination unit that determines, on the basis of the detected sound, a time axis of second content reproduced outside subsequent to the first content; and a content reproduction unit that reproduces third content corresponding to the second content in synchronization with reproduction of the second content on the basis of the determined time axis.

Note that a "unit" in the present invention does not merely represent physical means, and the present invention also includes a case in which the function of the "unit" is implemented by software. Further, the function of one "unit" or device may be implemented by two or more physical means or devices, or the functions of two or more "units" or devices may be implemented by one physical means or device.

Advantageous Effects of Invention

According to the present invention, a content reproduction program and a content reproduction device that easily and reliably determine the time axis of certain content and reproduce other content in synchronization with the reproduction of the content can be provided.

DESCRIPTION OF EMBODIMENTS

Figure 1:
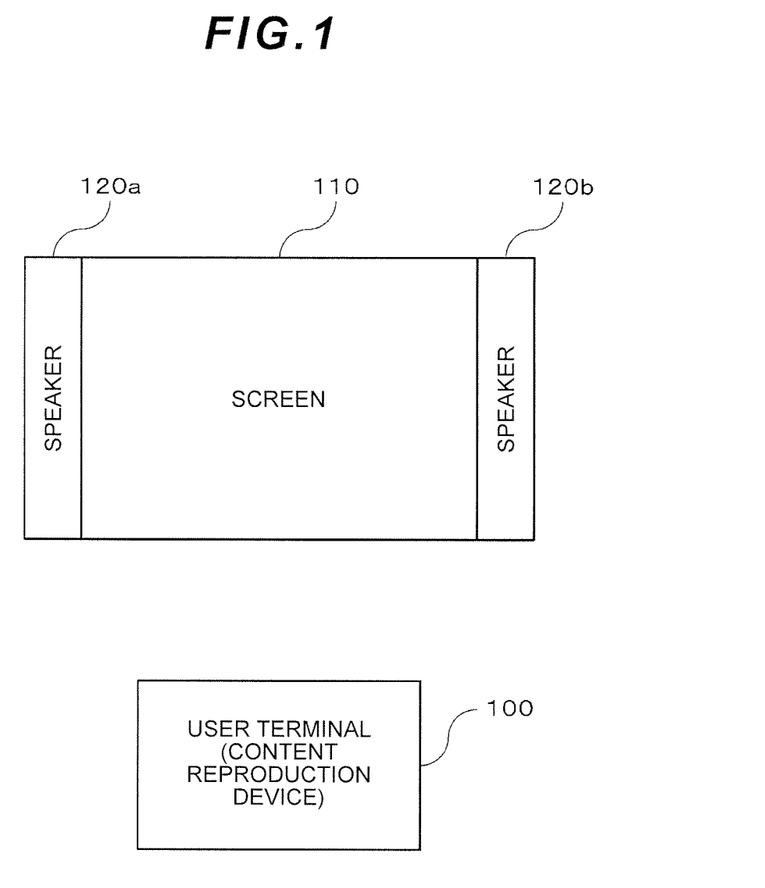
FIG. 1 is a diagram showing the configuration of a content reproduction system that is an embodiment of the present invention.

A preferred embodiment of the present invention will be described with reference to the accompanying drawings. FIG. 1 is a diagram showing the configuration of a content reproduction system that is an embodiment of the present invention. The content reproduction system includes a user terminal 100 (content reproduction device), a screen 110, and speakers 120. The screen 110 and the speakers 120 are installed in, for example, a facility such as a movie theater and a stadium, and the user terminal 100 is used by a user who uses the facility. The video of content such as a movie is displayed on the screen 110, and the sound of the content is output from the speakers 120. Then, in the user terminal 100, other content such as subtitles and an audio guide is reproduced in synchronization with the reproduction of the content.

Figure 2:
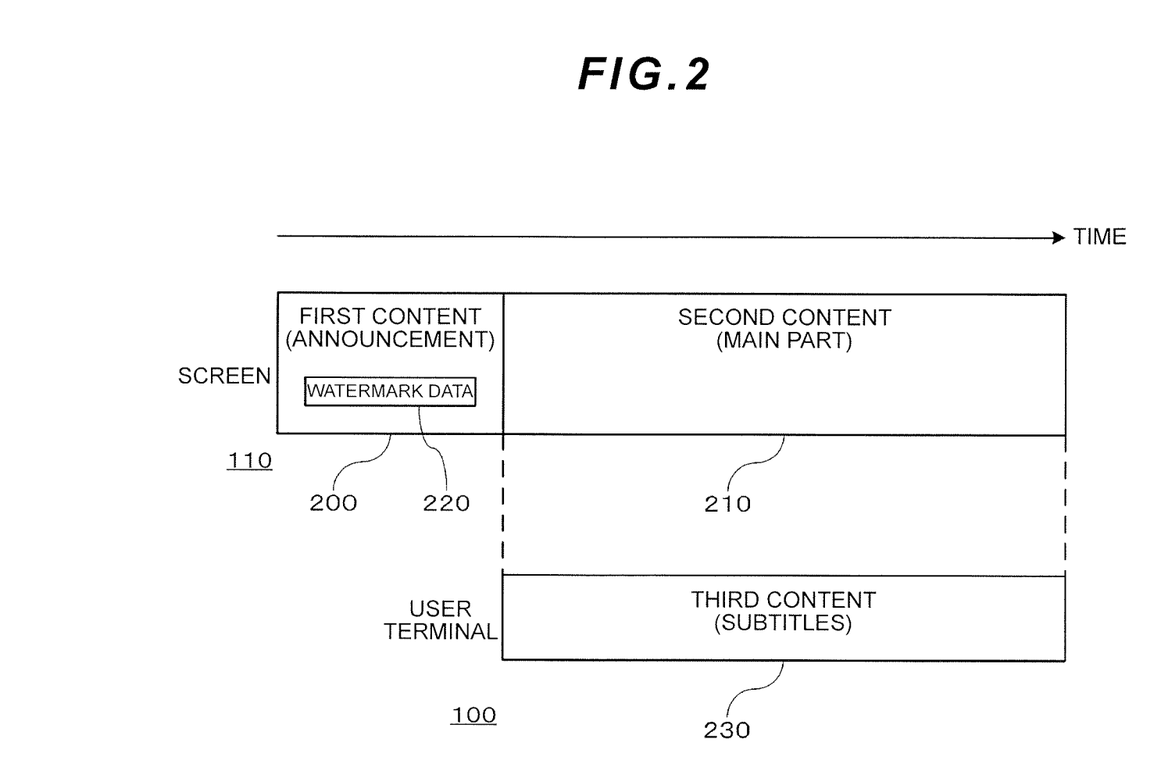
FIG. 2 is a diagram showing the outline of content reproduction in the content reproduction system.

FIG. 2 is a diagram showing the outline of content reproduction in the content reproduction system.

Content reproduced in a facility such as a movie theater contains first content 200 and second content 210 reproduced subsequent to the first content 200. The second content 210 is, for example, the main part of a movie. Further, the first content 200 is, for example, a trailer, an advertisement, or the like (announcement) reproduced before the main part of a movie. In the first content 200, watermark data 220 is embedded in its sound. The watermark data 220 is, for example, embedded for each frame of the first content 200 and contains data (first data) such as a time code for determining the start timing (time axis) of the second content 210. Further, the watermark data 220 contains, for example, data (second data) indicating a facility, an area, or the like.

Third content 230 reproduced by the user terminal 100 is, for example, the text of the subtitles of a movie reproduced in synchronization with the main part of the movie. The third content 230 can be any content such as an audio guide, a sign-language image, and an explanatory image without being limited to subtitles so long as it is reproduced in synchronization with the second content 210. In the user terminal 100, the start timing (time axis) of the second content 210 is determined on the basis of the watermark data 220, and the third content 230 is reproduced in synchronization with the second content 210.

Figure 3:
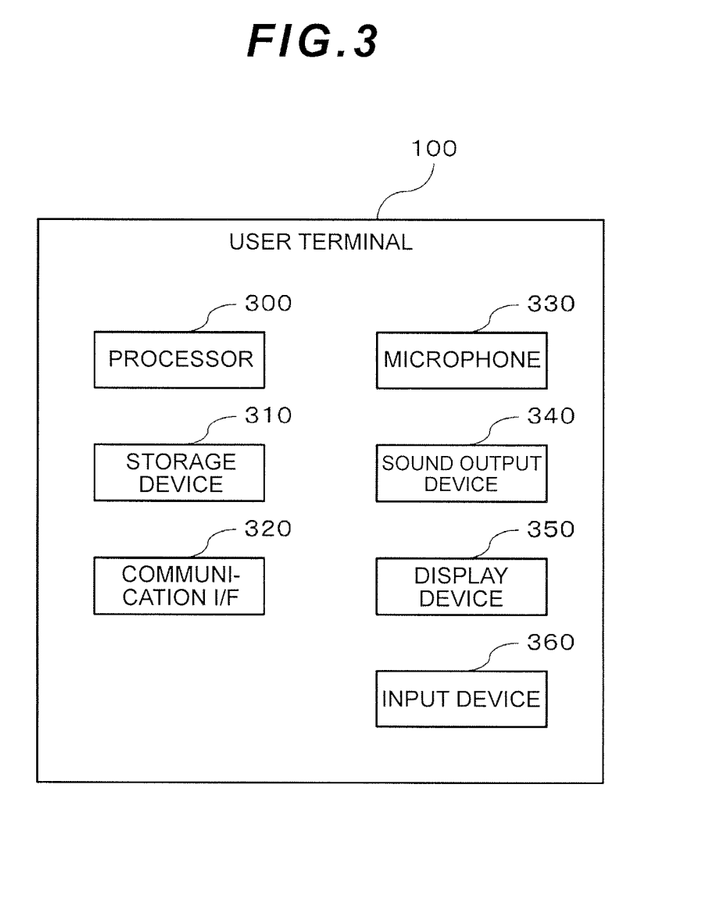
FIG. 3 is a diagram showing an example of the hardware configuration of a user terminal 100.

FIG. 3 is a diagram showing an example of the hardware configuration of the user terminal 100. The user terminal 100 is, for example, a computer such as a smart phone and a tablet terminal. As shown in FIG. 3, the user terminal 100 includes a processor 300, a storage device 310, a communication interface (I/F) 320, a microphone 330, a sound output device 340, a display device 350, and an input device 360.

The processor 300 can implement various functions in the user terminal 100 by performing a program stored in the storage device 310.

The storage device 310 is a storage region that stores a program or data. The storage device 310 can include a volatile memory that is a temporary storage region or a non-volatile memory that is a permanent storage region. The storage device 310 may be provided outside the user terminal 100.

The communication interface 320 is an interface device for performing the transmission and reception of a program or data with an outside device. The communication interface 320 includes, for example, an interface for a mobile telephone communication network or an interface for a wireless LAN (Local Area Network). The communication interface 320 may include a wired interface.

The microphone 330 detects surrounding sound. The microphone 330 can detect not only sound in an audible range but also sound in a non-audible range. The microphone 330 may be provided outside the user terminal 100.

The sound output device 340 is an output device for outputting sound. The sound output device 340 is, for example, a speaker. Further, the sound output device 340 may be a device for outputting sound to an earphone. When the third content 230 contains sound (for example, an audio guide or dubbing sound), the sound is output from the sound output device 340.

The display device 350 is an output device for displaying an image (still image or moving image). The display device 350 is, for example, a liquid crystal display or an organic EL (Electroluminescence) display. The display device 350 may be provided outside the user terminal 100. When the third content 230 contains an image (for example, subtitles), the image is displayed on the display device 350.

The input device 360 is a device for receiving a user's input. The input device 360 may be, for example, a touch panel integrally formed with the display device 350. The input device 360 may be provided outside the user terminal 100.

Figure 4:
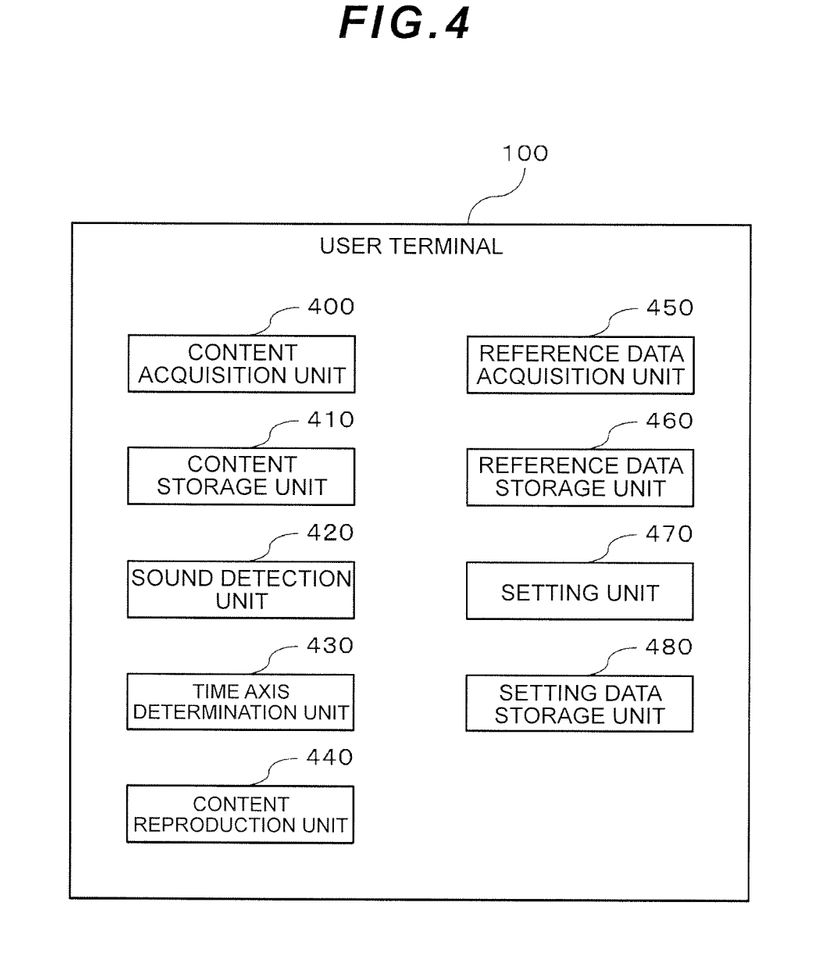
FIG. 4 is a diagram showing an example of the function configuration of the user terminal 100.

FIG. 4 is a diagram showing an example of the function configuration of the user terminal 100. The user terminal 100 includes a content acquisition unit 400, a content storage unit 410, a sound detection unit 420, a time axis determination unit 430, a content reproduction unit 440, a reference data acquisition unit 450, a reference data storage unit 460, a setting unit 470, and a setting data storage unit 480. The respective units shown in FIG. 4 can be implemented, for example, when the storage region of the storage device 310 is used or when a program (content reproduction program) stored in the storage device 310 is performed by the processor 300.

Figure 5:
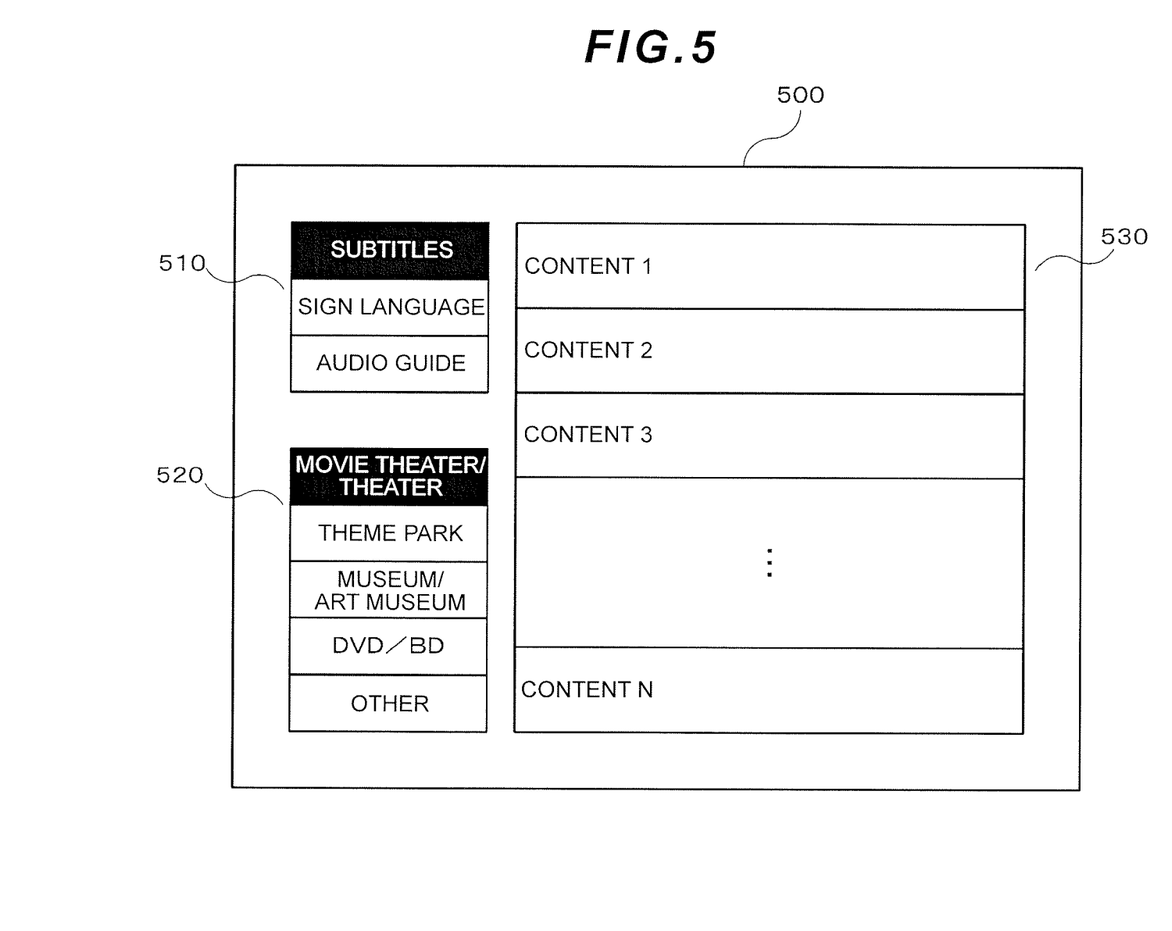
FIG. 5 is a diagram showing an example of a user interface for acquiring content.

The content acquisition unit 400 acquires the third content 230 reproduced by the user terminal 100 via, for example, the Internet and stores the acquired third content 230 in the content storage unit 410. FIG. 5 is a diagram showing an example of a user interface for acquiring content. A screen 500 is displayed, for example, when an application for reproducing the third content 230 is activated. The screen 500 includes regions 510 and 520 for selecting content types.

The screen 500 enables the selection of subtitles, sign language, or an audio guide in the region 510. Further, the screen 500 enables the selection of a movie theater/theater, a theme park, a museum/art museum, a DVD/BD, or other in the region 510. Then, a content list corresponding to content selected in the regions 510 and 520 is displayed in a region 530. In the region 530, the title of the second content 210 (for example, the main part) is, for example, displayed. The content acquisition unit 400 acquires the third content 230 corresponding to the second content 210 selected in the region 530. Note that the content acquisition unit 400 may acquire the third content 230 containing an object not to be reproduced.

Further, the content acquisition unit 400 may acquire the third content 230 specified by sound (watermark data or fingerprint) detected in the first content 200. For example, when watermark data embedded in the first content 200 contains data (second data) for specifying the third content 230, the content acquisition unit 400 may acquire the third content 230 on the basis of the data.

The sound detection unit 420 detects the sound of content reproduced outside the user terminal 100. Specifically, the sound detection unit 420 can detect the sound of the first content 200 (announcement). Further, the sound detection unit 420 can also detect the sound of the second content 210 (main part). The sound detected by the sound detection unit 420 is, for example, watermark data or fingerprint. The sound detection unit 420 can stop operating when the time axis of the second content 210 is determined by the time axis determination unit 430.

The time axis determination unit 430 determines the time axis of the second content 210 on the basis of sound detected by the sound detection unit 420. Specifically, the time axis of the second content 210 can be determined on the basis of, for example, data (first data) for determining the time axis of the second content 210, contained in watermark data embedded in the sound of the first content 200. Further, the time axis determination unit 430 can determine the time axis of the second content 210 during the reproduction of the second content 210 on the basis of the fingerprint of the sound of the second content 210. Here, in the determination of the time axis of the second content 210, the reproduction timing of the second content 210 is associated with time. For example, the time axis determination unit 430 can determine time at which the reproduction of the second content 210 is started (for example, actual time or relative time based on a certain point). Further, for example, the time axis determination unit 430 can determine which part of the second content 210 is being currently reproduced. The time axis determination unit 430 can stop operating when the time axis of the second content 210 is determined.

Figure 6:
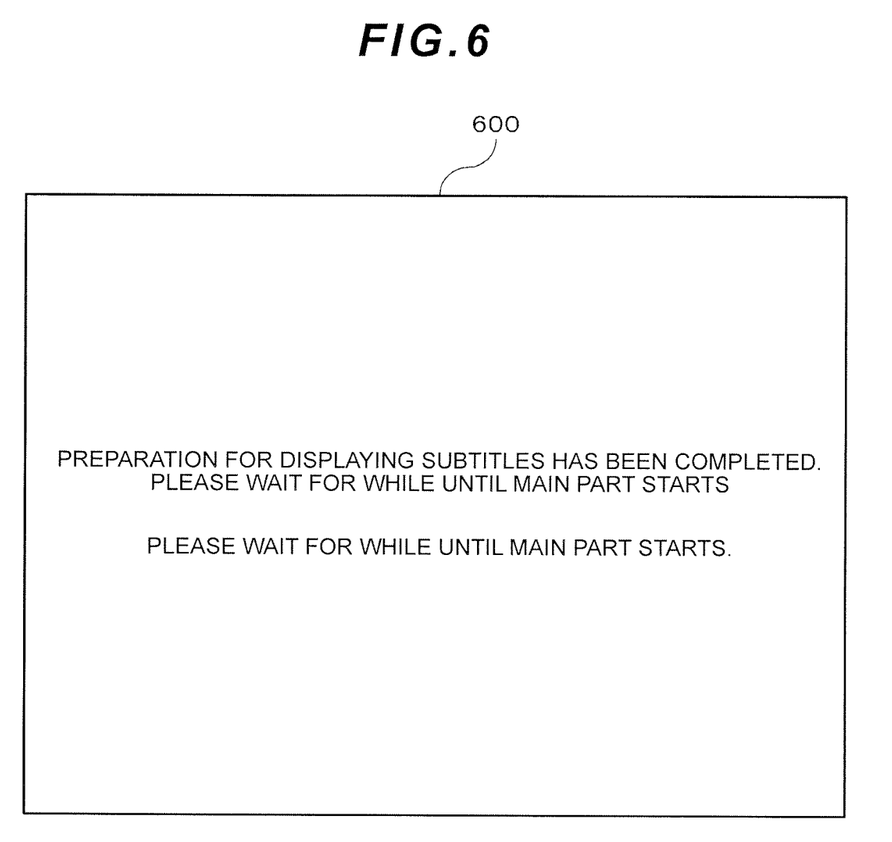
FIG. 6 is a diagram showing an example of a screen on which the state of determination of a time axis has been displayed.

The content reproduction unit 440 reproduces the third content 230 with (in synchronization with) the reproduction of the second content 210 on the basis of a time axis determined by the time axis determination unit 430. Further, the content reproduction unit 440 can output information indicating the state of determination of a time axis determined by the time axis determination unit 430. FIG. 6 is a diagram showing an example of a screen on which the determination state of the time axis has been displayed. As shown in a screen 600 of FIG. 6, the content reproduction unit 440 can display, on the display device 350, a message (for example, "Preparation for displaying subtitles has been completed. Please wait for a while until the main part starts.") indicating that the determination of a time axis has been completed.

The reference data acquisition unit 450 acquires reference data required when the time axis determination unit 430 determines a time axis on the basis of fingerprint via, for example, the Internet, and stores the acquired reference data in the reference data storage unit 460. The reference data is data in which the feature amount of the sound of content is associated with the reproduction time of the content. The time axis determination unit 430 can determine the time axis of the second content 210 by comparing the feature amount of the sound of the first content 200 or the second content 210 with the reference data.

The setting unit 470 receives a setting for reproducing the third content 230 from a user and stores setting data indicating the setting in the setting data storage unit 480. The content reproduction unit 440 can reproduce the third content 230 on the basis of the setting data.

Figure 7:
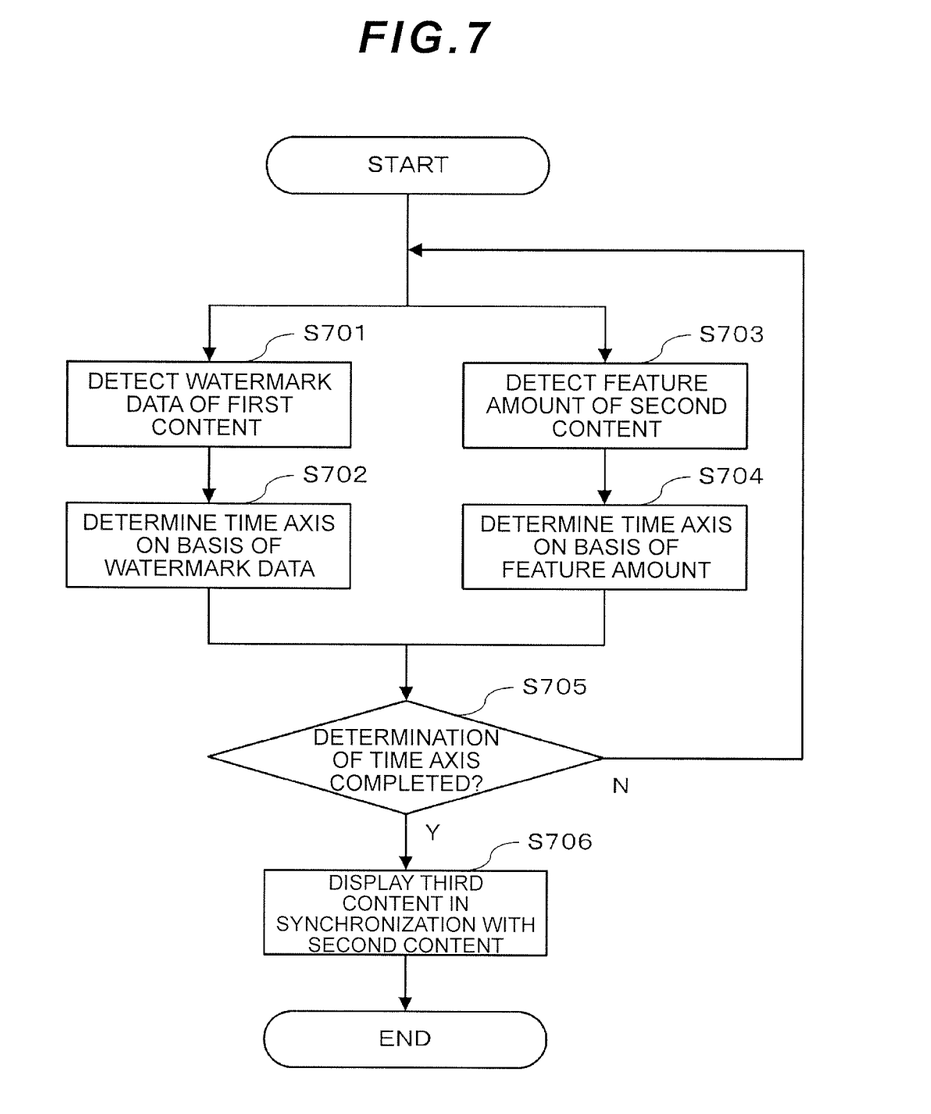
FIG. 7 is a flowchart showing an example of content reproduction processing in the user terminal 100.

FIG. 7 is a flowchart showing an example of content reproduction processing in the user terminal 100. The processing shown in FIG. 7 is started, for example, when a user activates an application.

The sound detection unit 420 starts detecting watermark data embedded in the sound of the first content 200 (S701). After the watermark data is detected, the time axis determination unit 430 determines the time axis of the second content 210 on the basis of the watermark data (S702). Note that the time axis determination unit 430 may determine the time axis of the second content 210 on the basis of the fingerprint of the sound of the first content 200.

Further, the sound detection unit 420 performs the determination (S703 to S704) of a time axis based on the sound of the second content 210 concurrently with the determination (S701 to S702) of the time axis based on the sound of the first content 200. Specifically, the sound detection unit 420 starts detecting the fingerprint (feature amount) of the sound of the second content 210 (S703). Then, the time axis determination unit 430 determines the time axis of the second content 210 on the basis of the fingerprint (S704).

The determination processing (S703 to S704) of the time axis based on the sound of the second content 210 is effective, for example, in a case in which the user starts watching the second content 210 after the reproduction of the second content 210 is started, a case in which the determination (S701 to S702) of the time axis based on the sound of the first content 200 is not normally operated, or the like.

The determination processing of the time axis is repeatedly performed unless the determination (S701 to S704) of the time axis based on the sound of the first content 200 or the second content 210 is completed (S705: N). Then, when the determination of the time axis is completed (S705: Y), the sound detection unit 420 and the time axis determination unit 430 stop operating and the content reproduction unit 440 reproduces the third content 230 in synchronization with the reproduction of the second content 210 on the basis of the determined time axis (S706).

The embodiment of the present invention is described above. According to the embodiment, the time axis of the second content 210 (for example, the main part) reproduced subsequent to the first content 200 can be determined on the basis of the sound of the first content 200 (for example, announcement). Then, the third content 230 (for example, subtitles or an audio guide) corresponding to the second content 210 can be reproduced in synchronization with the reproduction of the second content 210 on the basis of the determined time axis. Accordingly, even in a case in which watermark data is not embedded in the sound of the second content 210 or a case in which the determination of the start timing of the second content 210 is difficult with the fingerprint of the sound of the second content 210, the time axis of the second content 210 can be easily and reliably determined.

Further, according to the embodiment, the time axis of the second content 210 can be determined on the basis of watermark data embedded in the sound of the first content 200. In many cases, it is easier to embed watermark data in the first content 200 than in the second content 210. Therefore, the time axis of the second content 210 can be easily and reliably determined with the watermark data embedded in the first content 200.

In addition, according to the embodiment, watermark data embedded in the sound of the first content 200 can be sound data in a non-audible range. Thus, the time axis of the second content 210 can be easily and reliably determined without exerting an influence on a user who watches the first content 200.

Further, according to the embodiment, the time axis of the second content 210 can be determined on the basis of the fingerprint (feature amount) of the sound of the second content 210, besides the determination of the time axis of the second content 210 based on watermark data embedded in the sound of the first content 200. Thus, for example, in a case in which a user starts watching the second content 210 after the reproduction of the second content 210 is started or the like, the time axis of the second content 210 can be easily and reliably determined.

Further, according to the embodiment, the watermark data 220 embedded in the sound of the first content 200 may contain data (for example, data indicating a facility, an area, or the like) for specifying the third content 230, besides data (for example, a time code) for determining a time axis. Thus, for example, the third content 230 can be selected by the watermark data 220 embedded in the sound of the first content 200.

Further, according to the embodiment, the time axis of the second content 210 may be determined on the basis of the feature amount of the sound of the first content 200. Thus, for example, even in a case in which the watermark data 220 is not embedded in the first content 200, the time axis of the second content 210 can be easily and reliably determined.

Further, according to the embodiment, the sound detection unit 420 and the time axis determination unit 430 can stop operating when the time axis of the second content 210 is determined. Thus, the power consumption of the user terminal 100 can be reduced.

Note that due to the influence of the performance or the like of the user terminal 100, there could be a deviation between the time axis of the second content 210 retained by the user terminal 100 and the actual time axis of the second content 210 after the time axis of the second content 210 is determined. Therefore, after the determination of the time axis of the second content 210 is completed, the time axis determination unit 430 may correct the time axis of the second content 210 on the basis of the fingerprint (feature amount) of the sound of the second content 210 at an appropriate timing. For example, after the determination of the time axis of the second content 210 is completed, the time axis determination unit 430 may correct the time axis of the second content 210 on the basis of the fingerprint (feature amount) of the sound of the second content 210 at a prescribed time interval. Further, for example, after the determination of the time axis of the second content 210 is completed, the time axis determination unit 430 may correct the time axis of the second content 210 on the basis of the fingerprint (feature amount) of the sound of the second content 210 according to instructions from a user.

Further, according to the embodiment, information indicating the state of determination of the time axis of the second content 210 can be output to the display device 350. Note that the output destination of the information is not limited to the display device 350 but may be the sound output device 340. Thus, the determination state of the time axis of the second content 210 can be informed to a user.

The embodiment described above is given to facilitate the understanding of the present invention and does not intend to limit the interpretation of the present invention. The respective elements provided in the embodiment and their arrangements, materials, conditions, shapes, sizes, or the like are not limited to those exemplified above but can be appropriately modified. Further, it is possible to partially replace or combine the configurations shown in different embodiments with each other.

REFERENCE SIGNS LIST

100 User terminal
110 Screen
120 Speaker
200 First content
210 Second content
220 Watermark data
230 Third content
300 Processor
310 Storage device
320 Communication interface
330 Microphone
340 Sound output device
350 Display device
360 Input device
400 Content acquisition unit
410 Content storage unit
420 Sound detection unit
430 Time axis determination unit
440 Content reproduction unit
450 Reference data acquisition unit
460 Reference data storage unit
470 Setting unit
480 Setting data storage unit

What is claimed is:

1. A computer-readable non-transitory recording medium comprising a content reproduction program for causing a computer to implement:
    a sound detection unit that detects sound of first content reproduced outside the computer by using a microphone, the sound being watermark data embedded in the first content;
    a time axis determination unit that determines, on the basis of the detected sound, a time axis of second content reproduced subsequent to the first content outside the computer by associating reproduction timing of the second content with time; and
    a content reproduction unit that reproduces third content corresponding to the second content in synchronization with reproduction of the second content on the basis of the determined time axis,
    wherein the watermark data contains first data for determining the time axis,
    wherein the sound detection unit further detects a feature amount of sound of the second content reproduced outside the computer, and
    wherein the time axis determination unit further determines the time axis of the second content by comparing the feature amount of the sound of the second content with reference data, the reference data being data in which the feature amount is associated with the reproduction timing of the second content.

2. The computer-readable non-transitory recording medium according to claim 1, wherein
    the watermark data is sound data in a non-audible range.

3. The computer-readable non-transitory recording medium according to claim 1, wherein
    the watermark data further contains second data for specifying the third content, and
    the content reproduction unit reproduces the third content on the basis of the second data.

4. The computer-readable non-transitory recording medium according to claim 1, wherein
    the sound detection unit detects a feature amount of the sound of the first content, and
    the time axis determination unit determines the time axis on the basis of the detected feature amount of the sound of the first content.

5. The computer-readable non-transitory recording medium according to claim 1, wherein
    the sound detection unit and the time axis determination unit stop operating when the time axis is determined.

6. The computer-readable non-transitory recording medium according to claim 1, wherein
    the time axis determination unit corrects the time axis on the basis of the feature amount of the sound of the second content after the time axis is determined.

7. The computer-readable non-transitory recording medium according to claim 1, wherein
    the content reproduction unit outputs information indicating a state of determination of the time axis.

8. A content reproduction device comprising:
a sound detection unit that detects sound of first content reproduced outside by using a microphone, the sound is watermark data embedded in the first content;
a time axis determination unit that determines, on the basis of the detected sound, a time axis of second content reproduced subsequent to the first content outside by associating reproduction timing of the second content with time; and
a content reproduction unit that reproduces third content corresponding to the second content in synchronization with reproduction of the second content on the basis of the determined time axis,
wherein the watermark data contains first data for determining the time axis,
wherein the sound detection unit further detects a feature amount of sound of the second content reproduced outside the computer, and
wherein the time axis determination unit further determines the time axis of the second content by comparing the feature amount of the sound of the second content with reference data, the reference data being data in which the feature amount is associated with the reproduction timing of the second content.

* * * * *